United States Patent [19]

Sellers

[11] Patent Number: 5,677,826
[45] Date of Patent: Oct. 14, 1997

[54] DOUBLE SPRING COLLAPSIBLE KEYBOARD STRUCTURE FOR A NOTEBOOK COMPUTER, RESPONSIVE TO OPENING AND CLOSING OF THE COMPUTER'S LID VIA RELATIVELY SHIFTABLE KEY SUPPORT STRUCTURE AND SHIFT MEMBER

[75] Inventor: Charles A. Sellers, Houston, Tex.

[73] Assignee: Compaq Computer Corporation, Houston, Tex.

[21] Appl. No.: 717,638

[22] Filed: Sep. 23, 1996

Related U.S. Application Data

[63] Continuation-in-part of Ser. No. 633,009, Apr. 16, 1996, Pat. No. 5,654,872, which is a continuation of Ser. No. 268,818, Jun. 30, 1994, Pat. No. 5,532,904.

[51] Int. Cl.$^6$ .................. G06F 1/16; B41J 11/56; H05K 7/04; B01H 13/02
[52] U.S. Cl. .................. 361/680; 400/490; 400/682; 200/5 A; 200/344; 200/345
[58] Field of Search .................. 200/5 A, 512, 200/517, 520, 341, 344, 345; 400/479, 490, 491.2, 682; 364/708.1; 341/22; 235/1 D, 145 R, 146; 361/680

[56] References Cited

U.S. PATENT DOCUMENTS

| 5,324,902 | 6/1994 | Shen | 200/517 |
| 5,380,970 | 1/1995 | Mizuno et al. | 200/517 X |
| 5,424,516 | 6/1995 | Emmons | 200/517 X |
| 5,466,901 | 11/1995 | Mochizuki | 200/517 X |
| 5,512,722 | 4/1996 | Ozeki et al. | 200/517 |

FOREIGN PATENT DOCUMENTS

| 579409 | 1/1994 | European Pat. Off. | 200/517 |
| 2039417 | 8/1980 | United Kingdom | 200/517 |

*Primary Examiner*—Michael W. Phillips
*Attorney, Agent, or Firm*—Konneker & Smith

[57] ABSTRACT

A notebook computer is provided with a collapsible keyboard structure in which the keys are vertically moveable, toward and away from an underlying key support structure, through a stroke distance. Each key has an upper return spring member secured to and depending therefrom, and overlies a lower return spring member secured to a signal pad structure that underlies the key support structure and is horizontally shiftable relative thereto. As each key is manually depressed through its stroke distance its associated separate upper and lower return spring members cooperate in series to resiliently resist the downward movement of the key through its entire stroke distance, and also function to return the key to its upwardly extended pre-stroke position. In response to a horizontal shifting of the signal pad structure relative to the key support structure, each key is driven downwardly to a retracted storage and transport orientation thereof. The separate upper and lower return spring members associated with each key, in response to retraction of the key, are moved to a horizontally side-by-side position that permits the key retraction without appreciable vertical compression of the bottom return spring member which, with the key being moved through its operative key stroke, would otherwise cause the forcible engagement of a pair of electrical contacts underlying the bottom spring member.

34 Claims, 3 Drawing Sheets

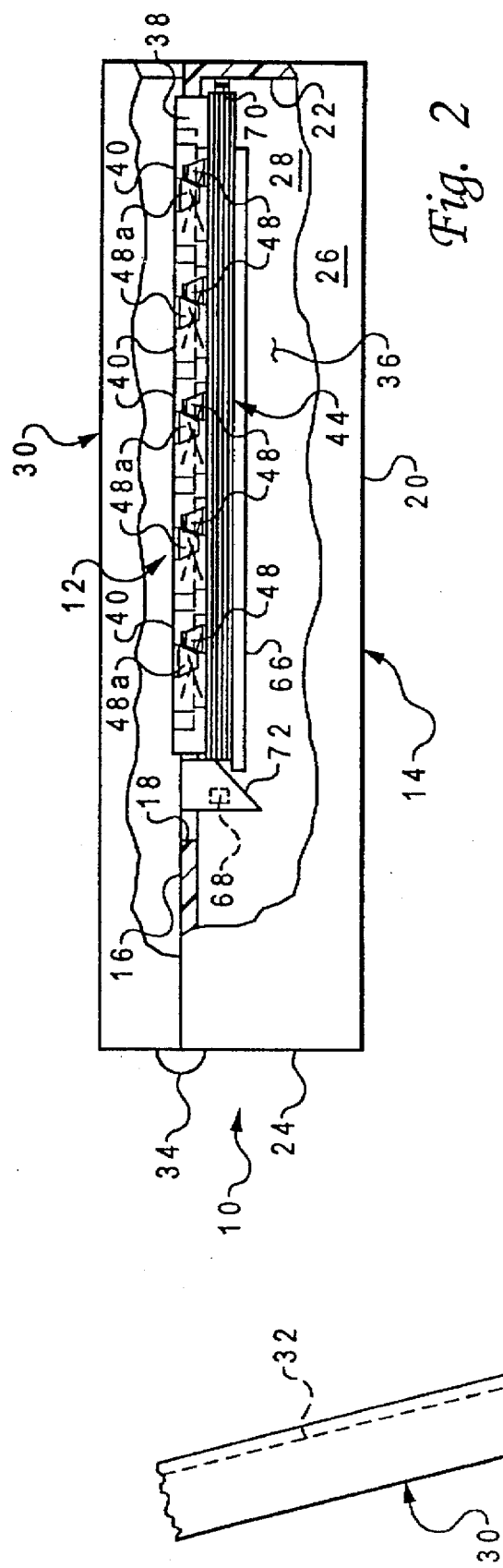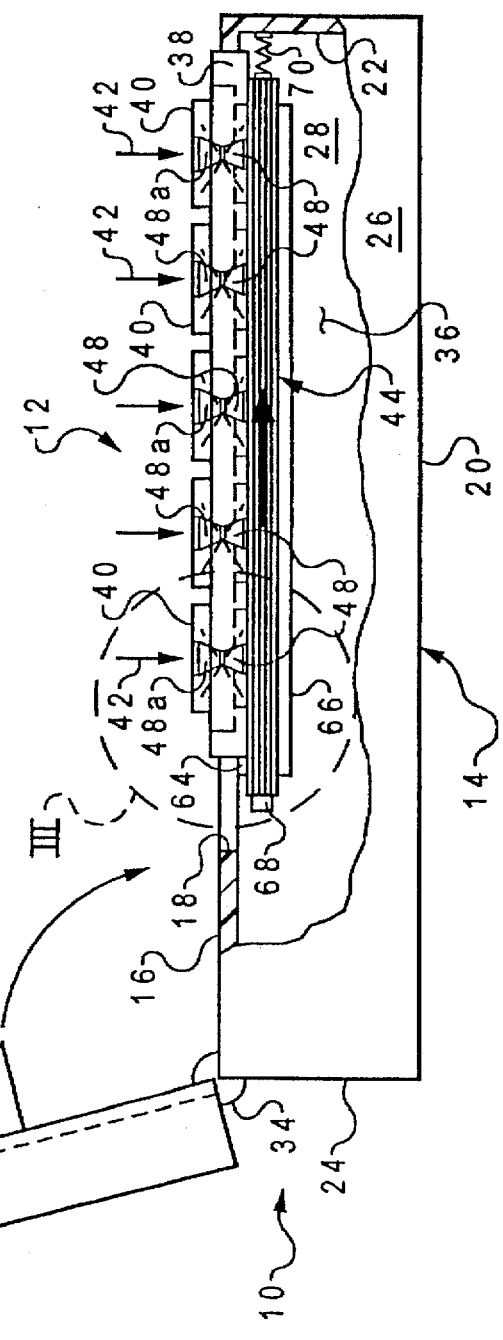

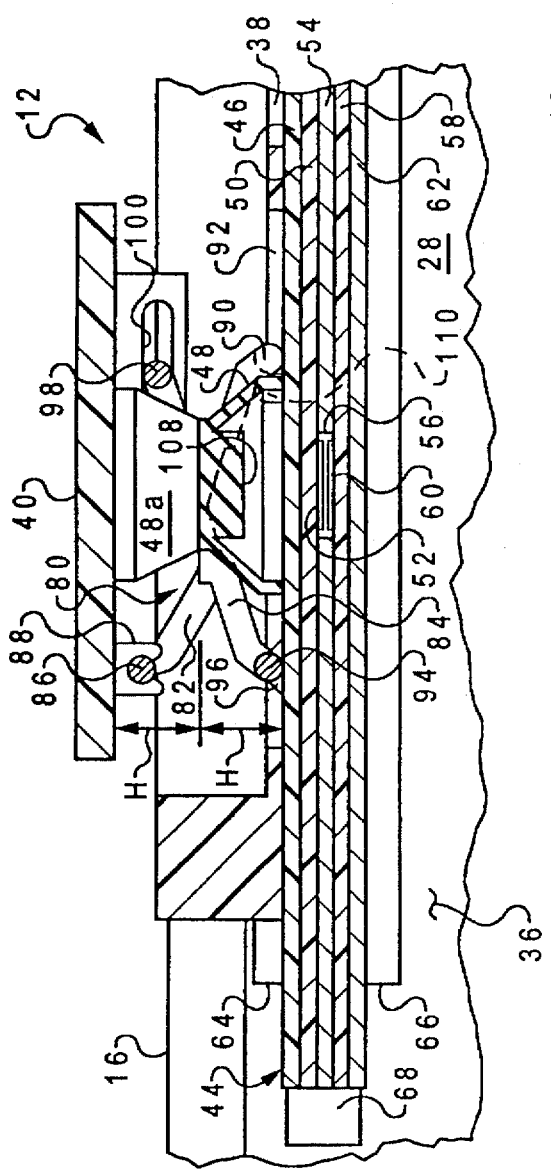
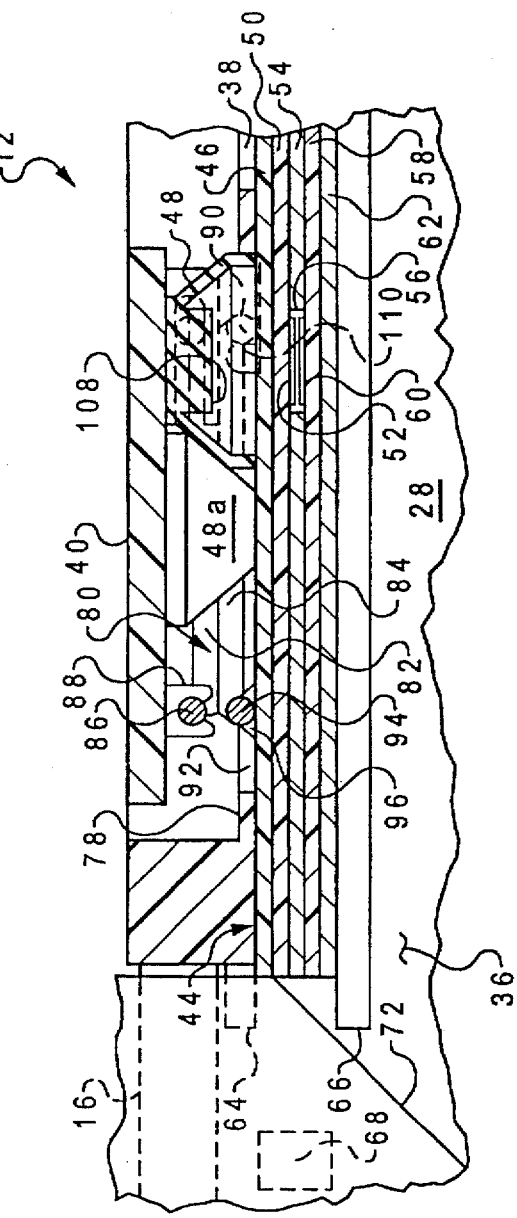

DOUBLE SPRING COLLAPSIBLE KEYBOARD STRUCTURE FOR A NOTEBOOK COMPUTER, RESPONSIVE TO OPENING AND CLOSING OF THE COMPUTER'S LID VIA RELATIVELY SHIFTABLE KEY SUPPORT STRUCTURE AND SHIFT MEMBER

CROSS REFERENCE TO RELATED APPLICATION

This application is a continuation-in-part of U.S. application Ser. No. 08/633,009 which was filed on Apr. 16, 1996, now U.S. Pat. No. 5,654,872, as a continuation of U.S. application Ser. No. 08/268,818 filed on Jun. 30, 1994 and now U.S. Pat. No. 5,532,904.

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

As can be readily seen from the foregoing, it would be desirable to provide an improved notebook computer keyboard structure which permits a useful thickness reduction in the closed computer without a corresponding reduction in the operative keystroke distance of the keyboard structure. It is accordingly an object of the present invention to provide such an improved notebook computer keyboard structure.

SUMMARY OF THE INVENTION

In carrying out principles of the present invention, in accordance with a preferred embodiment thereof, a portable computer, representatively a notebook computer, is provided with a specially designed collapsible keyboard structure operatively carried in a base housing portion of the computer.

The keyboard structure has a support structure having a top side, and a key (a representative one of a series thereof) carried on the top side of the support structure for movement toward and away therefrom, through a stroke distance, between an upwardly extended position and a downwardly depressed position.

An upper return spring member is secured to and depends from the key, the upper return spring member having a height parallel to the key stroke direction. A lower return spring member is secured to the support structure and underlies the key, the lower return spring member having a height parallel to the key stroke direction.

The upper and lower return spring members are cooperable to be compressed by and resiliently and yieldably resist the downward movement of the key throughout substantially the entire stroke distance, with the height of at least one of the upper and lower return spring members being substantially less than the key stroke distance. Representatively, the height of each of the upper and lower return spring member is substantially less than the key stroke distance.

Retraction means are preferably provided and are operable to forcibly move the key downwardly from its upwardly extended position to a retracted storage and transport position spaced upwardly apart from it downwardly depressed position. The upper and lower spring members are disposed in a generally series arrangement along the key stroke axis when the key is in its upwardly extended position. When the key is driven to its retracted position the upper and lower return spring members are relatively oriented in a manner such that the lower return spring member (which, when substantially compressed, forcibly engages two underlying electrical switch contact members) is substantially uncompressed.

In one embodiment of the collapsible keyboard structure, the upper and lower return spring members are elastomeric key return domes which are vertically stacked when the key is in its upwardly extended position, and are brought to a horizontally offset, side-by-side relationship by a shifting structure responsive to the operation of the aforementioned retraction structure which brings the key to its retracted position. A return structure is provided to selectively force the key back to its upwardly extended position by causing a camming action between opposing, sloping side surfaces of the side-by-side upper and lower return spring members.

In an alternate embodiment of the collapsible keyboard structure, the key is provided with a depending peripheral skirt formed from a resilient material. The skirt at least partially conceals from the computer user the linkage mechanism used to secure the key to the underlying support structure. When the key is in its upwardly extended position, a lower side edge of the skirt is spaced upwardly apart from the top side of the support structure, and when the key is forced downwardly to its retracted storage and transport orientation the .skirt is resiliently deflected by and outwardly along the top side of the underlying support structure.

BRIEF DESCRIPTION OF THE DRAWINGS

FIG. 1 is a partially sectioned, simplified side elevational view of a notebook computer having a collapsible keyboard structure embodying principles of the present invention, the computer being in an opened orientation and the keyboard structure being in its key-extended use configuration;

FIG. 2 is a view similar to that in FIG. 1, but with the computer in its closed orientation and the keyboard structure being in its key-retracted storage/transport orientation;

FIGS. 3A and 3C are enlarged scale cross-sectional detail views of the circled area III in FIG. 1 with the keyboard key cap members respectively in their extended use positions and their retracted storage/transport positions;

DETAILED DESCRIPTION

Figure 4:
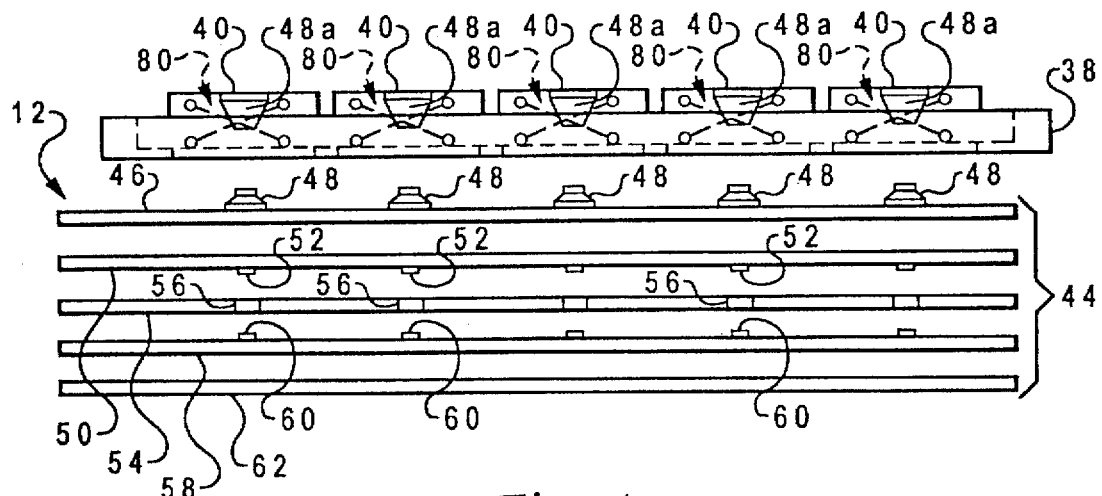
FIG. 4 is a highly schematic exploded side elevational view of the keyboard structure.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3B); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of lower rubber key return domes 48 projecting upwardly from its top side; (2) a plastic top circuit sheet 50 having a spaced series of circular, electrically conductive pads 52 disposed on its bottom side, aligned with the lower domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46,50,54,58,62 are suitably held in their indicated stacked orientation to combinatively define the overall signal pad structure 44. As illustrated in FIGS. 1, 3A and 3C, the signal pad structure 44 has opposite side edge portions that are slidably retained between two sets of horizontal rail member pairs 64,66 formed on the interior sides of the base housing side walls 26 and 28. For purposes later described, the rail member pairs 64,66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3C) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

In a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3C retracted position (when the signal pad structure 44 is in its rightwardly shifted second position).

Figure 3B:
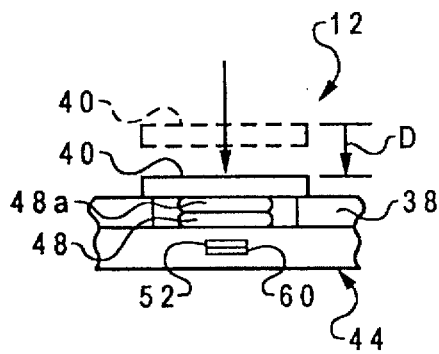
FIG. 3B is a schematic cross-sectional detail view of the circled area III in FIG. 1 with the keyboard key cap members in their operatively depressed positions.

Turning now to FIGS. 3A and 3B, each of the key cap members 40 representatively has a generally planar rectangular configuration. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84.

First ends of the arms 82 are joined by a cylindrical rod 86 pivotally anchored in tabs 88 projecting downwardly from the bottom side of the key cap member 40, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40. Each scissored linkage assembly 80 is movable relative to its associated key cap member 40 between an extended position shown in FIG. 3A, and a retracted position shown in FIG. 3C.

As illustrated in FIGS. 3A, 3C and 4, upper resilient key return domes 48a are secured to, and project downwardly from, central underside portions of the key cap members 40. Representatively, the external configurations of the upper domes 48a are substantially identical to those of the lower domes 48, with the reduced diameter ends of the lower and upper domes 48,48a respectively facing upwardly and downwardly, and each of the domes 48,48a representatively having substantially identical heights H.

With the lid housing 30 opened, the signal pad structure 44 is driven to its FIG. 3A position (by the spring members 70 shown in FIG. 1), and the key cap members 40 are in their FIG. 3A operatively extended positions in which the scissored linkage assemblies 80 are in their extended positions, with each of the upper resilient dome members 48a overlying and downwardly engaging an upper end of an associated lower resilient dome member 48.

When any of the key cap members 40 is manually depressed, against the combined resilient resistance of its associated pair of abutting upper and lower dome members 48a and 48, the domes 48a,48 are downwardly deformed (as schematically depicted in FIG. 3B, in which the scissored linkage assembly 80 has been removed for illustrative clarity) to cause an internal projection 108 in the lower dome 48 (see FIG. 3A) to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member 40 is manually released from its operatively depressed orientation schematically shown in FIG. 3B, it is automatically returned upwardly to its FIG. 3A position by the combined resilient force of its underlying key return domes 48a and 48 which function as a serially oriented duality of return spring means.

When the signal pad structure 44 is forwardly shifted from its FIG. 3A position to its FIG. 3C position, in response to closing the lid housing 30 as previously described, the bottom key return domes 48 are forwardly moved out from under their associated upper key return domes 48a, and the scissored linkage assemblies 80 are forcibly driven to their retracted FIG. 3C positions. This, in turn, downwardly drives the key cap members 40 to their FIG. 3C retracted positions in which each upper and lower dome pair 48a,48 are in their illustrated side-by-side relationship beneath their associated key cap member 40, thereby reducing the overall thickness of the collapsible keyboard structure 12 by a distance generally equal to the height H of one of the upper and lower resilient domes of spring members 48a,48.

Thus, in accordance with a primary aspect of the present invention, the overall key stroke distance D for each key cap member 40 is approximately equal to the stacked effective return spring height 2H. However, and quite advantageously, each key cap member 40 can be retracted, for storage and transport of the computer, through a distance (H) equal to approximately one half of this effective spring height without closing any of the contact pairs 52,60.

Stated in another manner, because of the unique separation of the total spring return structure into two separate segments, a relatively long, resiliently resisted keystroke is provided which is substantially longer than the height of either of the two key return spring segments. Additionally, the two separate resilient spring return structure segments cooperate during an active keystroke of their associated key cap member, but do not cooperate when the key cap member is moved through its storage/transport retraction stroke.

The forcible retraction of the key cap members 40 that places the dome pairs 48a,48 in their side-by-side relationship is effected by a spaced series of upward projections 110 formed on the top side of the dome sheet 46. Pairs of the projections 110 are positioned on opposite sides of the lower domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3C positions. Alternatively, the projections 110 could be omitted and the key cap members 40 permitted to fall by gravity to their retracted FIG. 3C positions when the signal pad structure 44 is rightwardly driven from its FIG. 3A position to its FIG. 3C position.

When the lid housing 30 is opened again, the resulting leftward or rearward driven movement of the signal pad structure 44 causes sloping rear side surface portions of the lower key return domes 48 to rearwardly and cammingly engage facing forwardly and upwardly sloped side surface portions of their associated upper dome members 48a in a manner forcing the linkage assemblies 80 back to their FIG. 3A extended positions in which the upper ends of the domes 48 underlie and supportingly engage the upper domes 48a to thereby return the key cap members 40 to their upwardly extended operative positions.

Figure 5A:
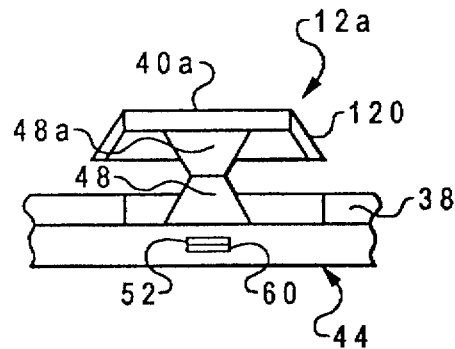
FIGS. 5A–5C are schematic cross-sectional views similar to those in FIGS. 3A–3C, but incorporating an alternate embodiment of the double spring collapsible key structure shown therein.
Figure 5B:
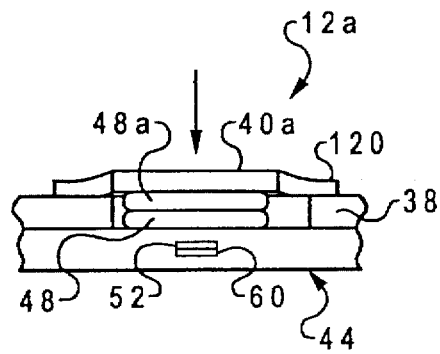
Figure 5C:
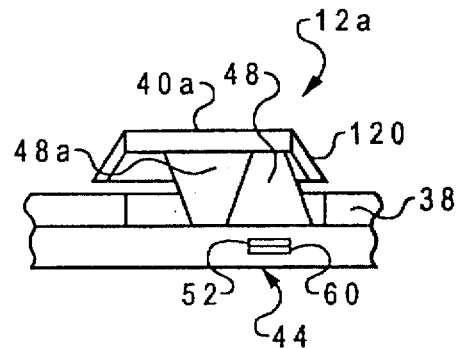

An alternate embodiment 12a of the previously described collapsible keyboard structure 12 is schematically depicted in FIGS. 5A–5C in which the scissored linkage assembly 80 associated with each key cap member has been omitted for illustrative clarity. In this alternate embodiment, a modified key cap member 40a is provided which differs from the previously described key cap member 40 in that a resilient, downwardly and horizontally outwardly sloped skirt portion 120 is suitably secured to the periphery of the key cap member 40a. The skirt 120 functions primarily in an aesthetic role by at least partially concealing the return and linkage structure beneath the key cap from the user's view.

With the skirted key cap member 40a in its FIG. 5A upwardly extended operating position, its associated upper and lower domes 48a,48 are operatively stacked as shown, and the lower side edge of the resilient peripheral key cap skirt 120 is spaced upwardly apart from the support structure 38. When the key cap member 40a is operatively depressed, as schematically illustrated in FIG. 5B, it compresses both of the domes 48a and 48, forces the contacts 52,60 together, and deflects the skirt 120 outwardly along the top side of the support structure 38. Finally, when the signal pad structure 44 is rightwardly shifted relative to the support structure 38 (see FIG. 5C), the upper and lower domes 48a,48 are brought to the illustrated side-by-side orientation similar to that previously described in conjunction with FIG. 3C.

The foregoing detailed description is to be clearly understood as being given by way of illustration and example only, the spirit and scope of the present invention being limited solely by the appended claims.

What is claimed is:

1. Keyboard apparatus comprising:
   a support structure having a top side; and
   a key carried on said top side of said support structure for movement toward and away therefrom, through a stroke distance, between an upwardly extended position and a downwardly depressed position;
   an upper return spring member secured to and depending from said key, said upper return spring member having a height parallel to the key stroke direction;
   a lower return spring member secured to said support structure and underlying said key, said lower return spring member having a height parallel to the key stroke direction,
   said upper and lower return spring members being cooperable to resiliently and yieldably resist the downward movement of said key through said stroke distance, with the height of each of said upper and lower return spring members being less than said stroke distance,
   said support structure including a key support portion on which said key is operatively carried, and a signal pad portion on which said lower return spring member is secured, said key support portion and said signal pad portion being relatively shiftable transversely to the key stroke direction;
   a shifting structure operative to selectively shift one of said key support portion and said signal pad portion relative to the other of said key support portion and said signal pad portion in opposite first and second directions transverse to the key stroke direction; and
   a retraction structure responsive to the shifting of said one of said key support portion and said signal pad portion relative to the other of said key support portion and said signal pad portion in said first direction to forcibly retract said key from said upwardly extended position thereof in a manner placing said upper and lower return spring members in a horizontally offset, side-by-side relationship with one another.

2. The keyboard apparatus of claim 1 wherein, with said key in said upwardly extended position thereof, said lower return spring member upwardly engages said upper return spring member, whereby as said key is moved downwardly from said upwardly extended position thereof said upper and lower return spring members are simultaneously and progressively compressed.

3. The keyboard apparatus of claim 2 wherein said upper and lower return spring members are elastomeric key return dome members.

4. The keyboard apparatus of claim 1 further comprising:
   a return structure operative in response to a shifting of said one of said key support portion and said signal pad portion relative to the other of said key support portion and said signal pad portion in said second direction forcibly move the retracted key upwardly to said upwardly extended position thereof.

5. The keyboard apparatus of claim 4 wherein said return structure includes sloping side surface portions of said upper and lower return spring members which oppose one another when said upper and lower return spring members are in said side-by-side relationship, and cammingly engage one another, in a manner driving said upper return spring member upwardly relative to said lower return spring member, when said one of said key support portion and said signal pad structure is shifted relative to the other of said key support portion and said signal pad structure in said second direction.

6. The keyboard apparatus of claim 1 wherein:
   said key has a depending peripheral skirt thereon.

7. Keyboard apparatus comprising:
   a support structure having a top side;
   a key carried on said top side of said support structure for movement toward and away therefrom, along an axis through a stroke distance, between an upwardly extended position and a downwardly depressed position;
   return spring means for resiliently and yieldably resisting a forced downward movement of said key from said upwardly extended position thereof to said downwardly depressed position thereof, said return spring means including separate first and second spring members positioned beneath said key and being respectively secured to said key and said support structure, said separate first and second spring members, when said key is in said upwardly extended position thereof, being positioned to be compressed in series by said key as it moves toward said downwardly depressed position thereof;
   retraction means operable to forcibly move said key downwardly from said upwardly extended position thereof to a retracted storage and transport position spaced upwardly apart from said downwardly depressed position thereof; and
   shifting means for shifting said upper and lower return spring members to a horizontally offset, generally side-by-side relationship to facilitate the movement of said key to said retracted storage and transport position thereof.

8. The keyboard apparatus of claim 7 wherein at least one of said first and second spring members has a vertical height less than said stroke distance.

9. The keyboard apparatus of claim 8 wherein both of said first and second spring members have a vertical height less than said stroke distance.

10. The keyboard apparatus of claim 9 wherein each of said first and second spring members is an elastomeric key return dome member.

11. A portable computer having a base housing with a keyboard structure supported therein, said keyboard structure comprising:
    a support structure having a top side;
    a key carried on said top side of said support structure for movement toward and away therefrom, through a stroke distance, between an upwardly extended position and a downwardly depressed position;
    an upper return spring member secured to and depending from said key, said upper return spring member having a height parallel to the key stroke direction;
    a lower return spring member secured to said support structure and underlying said key, said lower return spring member having a height parallel to the key stroke direction,
    said upper and lower return spring members being cooperable to resiliently and yieldably resist the downward movement of said key through said stroke distance, with the height of at least one of said upper and lower return spring members being less than said stroke distance,
    said support structure including a key support portion on which said key is operatively carried, and a signal pad portion on which said lower return spring member is secured, said key support portion and said signal pad portion being relatively shiftable transversely to the key stroke direction;

a shifting structure operative to selectively shift one of said key support portion and said signal pad portion relative to the other of said key support portion and said signal pad portion in opposite first and second directions transverse to the key stroke direction; and a retraction structure responsive to the shifting of said one of said key support portion and said signal pad portion relative to the other of said key support portion and said signal pad portion in said first direction to forcibly retract said key from said upwardly extended position thereof in a manner placing said upper and lower return spring members in a horizontally offset, side-by-side relationship with one another.

12. The portable computer of claim 11 wherein, with said key in said upwardly extended position thereof, said lower return spring member upwardly engages said upper return spring member, whereby as said key is moved downwardly from said upwardly extended position thereof said upper and lower return spring members are simultaneously and progressively compressed.

13. The portable computer of claim 12 wherein said upper and lower return spring members are elastomeric key return dome members each having a height less than said stroke distance.

14. The portable computer of claim 13 further comprising:

a return structure operative in response to a shifting of said one of said key support portion and said signal pad portion relative to the other of said key support portion and said signal pad portion in said second direction to forcibly move the retracted key upwardly to said upwardly extended position thereof.

15. The portable computer of claim 14 wherein said return structure includes sloping side surface portions of said upper and lower return spring members which oppose one another when said upper and lower return spring members are in said side-by-side relationship, and cammingly engage one another, in a manner driving said upper return spring member upwardly relative to said lower return spring member, when said one of said key support portion and said signal pad structure is shifted relative to the other of said key support portion and said signal pad structure in said second direction.

16. The portable computer of claim 11 wherein:

said key has a depending peripheral skirt thereon.

17. A portable computer having a base housing with a keyboard structure supported therein, said keyboard structure comprising:

a support structure having a top side;

a key carried on said top side of said support structure for movement toward and away therefrom, along an axis through a stroke distance, between an upwardly extended position and a downwardly depressed position;

return spring means for resiliently and yieldably resisting a forced downward movement of said key from said upwardly extended position thereof to said downwardly depressed position thereof, said return spring means including separate first and second spring members generally interposed between said key and said top side of said support structure and being respectively secured to said key and said support structure, said separate first and second spring members, when said key is in said upwardly extended position thereof, being positioned to be compressed in series by said key as it moves toward said downwardly depressed position thereof;

retraction means operable to forcibly move said key downwardly from said upwardly extended position thereof to a retracted storage and transport position spaced upwardly apart from said downwardly depressed position thereof; and shifting means for shifting said upper and lower return spring members to a horizontally offset, generally side-by-side relationship to facilitate the movement of said key to said retracted storage and transport position thereof.

18. The portable computer of claim 17 wherein at least one of said first and second spring members has a vertical height less than said stroke distance.

19. The portable computer of claim 18 wherein both of said first and second spring members have a vertical height less than said stroke distance.

20. The portable computer of claim 19 wherein each of said first and second spring members is an elastomeric key return dome member.

21. Keyboard apparatus comprising:

a key supported for movement along an axis through a stroke distance between an upwardly extended position and a downwardly depressed position;

a return spring structure for resiliently and yieldably resisting a forced downward movement of said key from said upwardly extended position thereof to said downwardly depressed position thereof, said return spring structure including separate first and second spring members positioned beneath said key, said separate first and second spring members, when said key is in said upwardly extended position thereof, being in a vertically stacked relationship and compressible in series by said key as it moves toward said downwardly depressed position thereof; and a shifting structure selectively operable to create a relative shift between said upper and lower return spring members transversely to said axis in a manner permitting said key to move to a downwardly retracted storage and transport position in which said upper and lower return spring members are relatively moved parallel to said axis to a side-by-side relationship.

22. The keyboard apparatus of claim 21 wherein said keyboard apparatus is a portable computer keyboard.

23. The keyboard apparatus of claim 22 wherein said portable computer keyboard is a notebook computer keyboard.

24. An electronic device comprising a housing and a collapsible keyboard carried by said housing, said collapsible keyboard including:

a key supported for movement along an axis through a stroke distance between an upwardly extended position and a downwardly depressed position;

a return spring structure for resiliently and yieldably resisting a forced downward movement of said key from said upwardly extended position thereof to said downwardly depressed position thereof, said return spring structure including separate first and second spring members positioned beneath said key, said separate first and second spring members, when said key is in said upwardly extended position thereof, being in a vertically stacked relationship and compressible in series by said key as it moves toward said downwardly depressed position thereof; and a shifting structure selectively operable to create a relative shift between said upper and lower return spring members transversely to said axis in a manner permitting said key to move to a downwardly retracted storage and transport position in which said upper and lower return spring members are relatively moved parallel to said axis to a side-by-side relationship.

25. The electronic device of claim 24 wherein said electronic device is a portable computer.

26. The electronic device of claim 25 wherein said portable computer is a notebook computer.

27. The electronic device of claim 24 wherein:

said electronic device further comprises a lid carried by said housing for movement relative thereto between open and closed positions, and said shifting structure is operative to (1) forcibly move said key from said upwardly extended position to said downwardly retracted storage and transport position in response to closing said lid, and (2) forcibly move said key from said downwardly retracted storage and transport position to said upwardly extended position in response to opening said lid.

28. A collapsible keyboard comprising:

a key supported for vertical movement along an axis;

a first return spring member supported by and depending from said key; and a second return spring member supported beneath and projecting upwardly toward said key, said key and said second return spring member being relatively shiftable transversely to said axis to selectively position said key in (1) an upwardly extended position in which said first and second return spring members are in a vertically stacked relationship, or (2) a downwardly collapsed position in which said first and second return spring members are in an axially staggered side-by-side relationship.

29. The collapsible keyboard of claim 28 wherein said collapsible keyboard is a portable computer keyboard.

30. The collapsible keyboard of claim 29 wherein said portable computer keyboard is a notebook computer keyboard.

31. An electronic device comprising a housing and a collapsible keyboard carried by said housing, said collapsible keyboard including:

a key supported for vertical movement along an axis;

a first return spring member supported by and depending from said key; and a second return spring member supported beneath and projecting upwardly toward said key, said key and said second return spring member being relatively shiftable transversely to said axis to selectively position said key in (1) an upwardly extended position in which said first and second return spring members are in a vertically stacked relationship, or (2) a downwardly collapsed position in which said first and second return spring members are in an axially staggered side-by-side relationship.

32. The electronic device of claim 31 wherein said electronic device is a portable computer.

33. The electronic device of claim 32 wherein said portable computer is a notebook computer.

34. The electronic device of claim 31 further comprising:

a lid carried by said housing for movement relative thereto between open and closed positions, and a shifting structure operative to (1) forcibly move said key from said upwardly extended position to said downwardly collapsed position in response to closing said lid, and (2) forcibly move said key from said downwardly collapsed position to said upwardly extended position in response to opening said lid.

* * * * *